United States Patent
Sinha et al.

(10) Patent No.: US 6,378,101 B1
(45) Date of Patent: Apr. 23, 2002

(54) MULTIPLE PROGRAM DECODING FOR DIGITAL AUDIO BROADCASTING AND OTHER APPLICATIONS

(75) Inventors: Deepen Sinha; Carl-Erik Wilhelm Sundberg, both of Chatham, NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/238,137

(22) Filed: Jan. 27, 1999

(51) Int. Cl.⁷ .............................................. H03M 13/29
(52) U.S. Cl. ...................................... 714/755; 714/776
(58) Field of Search ................................. 714/755, 776

(56) References Cited

U.S. PATENT DOCUMENTS

| | | | | |
|---|---|---|---|---|
| 5,442,626 A | * | 8/1995 | Wei .............................. | 370/20 |
| 5,463,641 A | | 10/1995 | Dorward et al. ............ | 371/37.4 |
| 5,493,339 A | * | 2/1996 | Birch et al. ................. | 348/461 |
| 5,506,903 A | * | 4/1996 | Yamashita .................... | 380/19 |
| 5,519,780 A | * | 5/1996 | Woo et al. .................... | 380/49 |
| 5,903,546 A | * | 5/1999 | Ikeda et al. .................. | 370/232 |
| 5,923,755 A | * | 7/1999 | Birch .......................... | 380/20 |
| 5,956,628 A | * | 9/1999 | Owaki ...................... | 455/158.4 |
| 6,115,366 A | * | 9/2000 | Campanella et al. ....... | 370/319 |
| 6,185,265 B1 | * | 2/2001 | Campanella ................. | 375/341 |

OTHER PUBLICATIONS

Wu, W., "Elements of Digital Satellite Communication" vol. II, Computer Science Press, 1985, 261–276.*

D. Sinha, J.D. Johnston, S. Dorward and S.R. Quackenbush, "The Perceptual Audio Coder," in Digital Audio, Section 42, pp. 42–1 to 42–18, CRC Press, 1998.

N.S. Jayant and E.Y. Chen, "Audio Compression: Technology and Applications," AT&T Technical Journal, pp. 23–34, vol. 74, No. 2, Mar.–Apr. 1995.

J. Hagenauer "Rate Compatible Punctured Convolutional Codes (RCPC Codes) and their Applications," IEEE Transactions on Communications, vol. 36, No. 4, pp. 389–400, Apr. 1988.

J. Hagenauer et al., "The Performance of Rate–Compatible Punctured Convolutional Codes for Digital Mobile Radio," IEEE Transactions on Communications, vol. 38, No. 7, pp. 966–980, Jul. 1990.

(List continued on next page.)

*Primary Examiner*—Stephen M. Baker
(74) *Attorney, Agent, or Firm*—Ryan, Mason & Lewis, LLP

(57) ABSTRACT

Methods and apparatus for decoding multiple program information, e.g., audio, video or image information, in a communication system are disclosed. In an illustrative embodiment, a multiple program decoder includes a deinterleaver for deinterleaving information corresponding to a set of frames, using a specified deinterleaving length. A given one of the frames includes information from each of at least a subset of the programs, and the frames are encoded using an outer code, e.g., a CRC code, RS code, BCH code or other type of linear block code, and an inner code, e.g., a convolutional code, turbo code or trellis coded modulation. The multiple program decoder includes an inner code decoder for decoding the inner code over one or more of the programs, and an outer code decoder for decoding the outer code for a selected one of the programs. The deinterleaving length of the deinterleaver and operating rate of the inner code decoder can be configured such that the multiple program decoder provides substantially instantaneous tuning within a given cluster of programs, or within a set of clusters each including multiple programs. The programs may, but need not, include jointly-coded audio programs. The invention may be implemented in numerous applications, such as simultaneous multiple program listening and/or recording, simultaneous delivery of audio and data, etc.

20 Claims, 5 Drawing Sheets

OTHER PUBLICATIONS

R.V. Cox et al., "Sub–band Speech Coding and Matched Convolutional Channel Coding for Mobile Radio Channels," IEEE Transactions on Acoustics, Speech and Signals Processing, vol. 39, No. 8, pp. 1717–1731, Aug. 1991.

A.R. Calderbank and N. Seshadri, "Multilevel Codes for Unequal Error Protection," IEEE Transactions on Information Theory, vol. 39, No. 4, pp. 1234–1248, Jul. 1993.

C.–E.W. Sundberg, "Digital Audio Broadcasting in the FM Band," Proceedings of the IEEE Symposium on Industrial Electronics, Portugal, Jul. 7–11, 1997.

C.–E.W. Sundberg, "Digital Audio Broadcasting: An Overview of Some Recent Activites in the U.S.," Proceedings of Norsig–97, Norwegian Signal Processing Symposium, Tromso, Norway, May 23–24, 1997.

B.W. Kroeger and A.J Vigil, "Improved IBOC DAB Technology for AM and FM Braodcasting," SBE Engineering Conference, pp. 1–10, 1996.

B.W. Kroeger and D. Cammarata, "Robust Modem and Coding Techniques for FM Hybrid IBOC DAB," IEEE Transactions on Broadcasting, vol. 43, No. 4, pp. 412–420, Dec. 1997.

B.W. Kroeger and P.J. Peyla, "Compatibility of FM Hybrid In–Band On–Channel (IBOC) System for Digital Audio Broadcast," IEEE Transactions on Broadcasting, vol. 43, No. 4, pp. 421–430, Deco 1997.

Takada et al., "An FM Multiplex Broadcasting System for Traffic Information Services", IEEE–IEE Vehicle Navigation & Information Systems Conf.—VNIS 1993, pp. 344–347, Deco 1993.*

* cited by examiner

MULTIPLE PROGRAM DECODING FOR DIGITAL AUDIO BROADCASTING AND OTHER APPLICATIONS

RELATED APPLICATION

The present application is related to U.S. patent application Ser. No. 09/238,136 entitled "Joint Multiple Program Coding for Digital Audio Broadcasting and Other Applications," and U.S. patent application Ser. No. 09/238,138 entitled "Joint Multiple Program Error Concealment for Digital Audio Broadcasting and Other Applications," both filed concurrently herewith in the name of inventors Deepen Sinha and Carl-Erik W. Sundberg.

FIELD OF THE INVENTION

The present invention relates generally to digital audio broadcasting (DAB) and other techniques for transmitting and receiving multiple program information, and more particularly to techniques for providing multiple program decoding for DAB and other applications.

BACKGROUND OF THE INVENTION

Perceptual audio coding devices, such as the perceptual audio coder (PAC) described in D. Sinha, J. D. Johnston, S. Dorward and S. R. Quackenbush, "The Perceptual Audio Coder," in Digital Audio, Section 42, pp. 42-1 to 42-18, CRC Press, 1998, which is incorporated by reference herein, perform audio coding using a noise allocation strategy whereby for each audio frame the bit requirement is computed based on a psychoacoustic model. PACs and other audio coding devices incorporating similar compression techniques are inherently packet-oriented, i.e., audio information for a fixed interval (frame) of time is represented by a variable bit length packet. Each packet includes certain control information followed by a quantized spectral/subband description of the audio frame. For stereo signals, the packet may contain the spectral description of two or more audio channels separately or differentially, as a center channel and side channels (e.g., a left channel and a right channel).

PAC encoding as described in the above-cited reference may be viewed as a perceptually-driven adaptive filter bank or transform coding algorithm. It incorporates advanced signal processing and psychoacoustic modeling techniques to achieve a high level of signal compression. In brief, PAC encoding uses a signal adaptive switched filter bank which switches between a Modified Discrete Cosine Transform (MDCT) and a wavelet transform to obtain compact description of the audio signal. The filter bank output is quantized using non-uniform vector quantizers. For the purpose of quantization, the filter bank outputs are grouped into so-called "codebands" so that quantizer parameters, e.g., quantizer step sizes, are independently chosen for each codeband. These step sizes are generated in accordance with a psychoacoustic model. Quantized coefficients are further compressed using an adaptive Huffman coding technique. PAC employs a total of 15 different codebooks, and for each codeband, the best codebook may be chosen independently. For stereo and multichannel audio material, sum/difference or other form of multichannel combinations may be encoded.

PAC encoding formats the compressed audio information into a packetized bitstream using a block sampling algorithm. At a 44.1 kHz sampling rate, each packet corresponds to 1024 input samples from each channel, regardless of the number of channels. The Huffman encoded filter bank outputs, codebook selection, quantizers and channel combination information for one 1024 sample block are arranged in a single packet. Although the size of the packet corresponding to each 1024 input audio sample block is variable, a long-term constant average packet length may be maintained as will be described below.

Depending on the application, various additional information may be added to the first frame or to every frame. For unreliable transmission channels, such as those in DAB applications, a header is added to each frame. This header contains critical PAC packet synchronization information for error recovery and may also contain other useful information such as sample rate, transmission bit rate, audio coding modes, etc. The critical control information is further protected by repeating it in two consecutive packets.

It is clear from the above description that the PAC bit demand is derived primarily by the quantizer step sizes, as determined in accordance with the psychoacoustic model. However, due to the use of Huffman coding, it is generally not possible to predict the precise bit demand in advance, i.e., prior to the quantization and Huffman coding steps, and the bit demand varies from frame to frame. Conventional PAC encoders therefore utilize a buffering mechanism and a rate loop to meet long-term bit rate constraints. The size of the buffer in the buffering mechanism is determined by the allowable system delay.

In conventional single program PAC bit allocation, the encoder makes a request for allocating a certain number of bits for a particular audio frame to a buffer control mechanism. Depending upon the state of the buffer and the average bit rate, the buffer control mechanism then returns the maximum number of bits which can actually be allocated to the current frame. It should be noted that this bit assignment can be significantly lower than the initial bit allocation request. This indicates that it is not possible to encode the current frame at an accuracy level for perceptually transparent coding, i.e., as implied by the initial psychoacoustic model step sizes. It is the function of the rate loop to adjust the step sizes so that bit demand with the modified step sizes is below, and close to, the actual bit allocation. The rate loop operates based on psychoacoustic principles to minimize the perception of excess noise. However, a substantial amount of undercoding, i.e., a noise allocation higher than that suggested by the psychoacoustic model, may be necessary to meet the rate constraints. The undercoding can lead to audible artifacts in the decoded audio output and is particularly noticeable at lower bit rates and for certain types of signals.

Perceptual audio coding techniques such as PAC encoding are particularly attractive for FM band and AM band transmission applications such as in-band digital audio broadcasting (DAB) systems, which are also known as hybrid in-band on-channel (HIBOC), all-digital IBOC and in-band adjacent channel (IBAC)/in-band reserve channel (IBRC) DAB systems. Perceptual audio coding techniques are also well suited for use in other applications, such as satellite DAB systems and Internet DAB systems. Although PAC and other conventional audio coding and decoding techniques often provide adequate performance in single program DAB transmission applications, further improvements are needed for multiple program transmission applications, e.g., multiple-program DAB, satellite DAB, Internet DAB, and other types of multiple program transmission. More particularly, a need exists for improvements in decoding techniques for multiple program transmission applications.

SUMMARY OF THE INVENTION

The present invention provides methods and apparatus for decoding in multiple program transmission applications, such as multiple program DAB. In an illustrative embodiment of the invention, a multiple program decoder includes a deinterleaver for deinterleaving information corresponding to a set of frames, using a specified deinterleaving length. A given one of the frames includes information from each of at least a subset of the programs, and the frames are encoded using an outer code, e.g., a CRC code, RS code, BCH code or other type of linear block code, and an inner code, e.g., a convolutional code, turbo code or trellis coded modulation. The multiple program decoder includes an inner code decoder for decoding the inner code over one or more of the programs, and an outer code decoder for decoding the outer code for a selected one of the programs. The multiple program decoder also includes, e.g., a PAC decoder or other suitable program decoder, which decodes the selected program and generates an output signal which can be supplied to an output device, e.g., a speaker or a set of speakers.

In accordance with the invention, the deinterleaving length of the deinterleaver and operating rate of the inner code decoder can be configured such that the multiple program decoder provides substantially instantaneous tuning within a given cluster of programs, or within a set of clusters each including multiple programs. For example, the deinterleaving length may correspond to a cluster of N programs, and the inner code decoder may decode the inner code over a single selected one of the N programs. As another example, the deinterleaving length may correspond to the cluster of N programs, and the inner code decoder may decode the inner code over all of the N programs in the cluster. In this case, separate outer code decoders and program decoders may be used to produce output signals for different ones of the N programs simultaneously. As a further example, the deinterleaving length may correspond to a set of K clusters, each including multiple programs, and the inner code decoder may decode the inner code over all of the programs in each of the K clusters. In this case, all of the programs in the K clusters are available for instantaneous tuning, and separate outer code decoders and programs decoders may be used to produce output signals for any of the programs.

The invention results in low tuning delay relative to conventional implementations without joint deinterleaving, e.g., implementations which deinterleave over one program such that the tuning delay corresponds approximately to the selected deinterleaving length. The invention may be implemented in numerous applications, such as simultaneous multiple program listening and/or recording, simultaneous delivery of audio and data, etc. Although well suited for use with jointly-coded audio programs, the invention does not require joint coding, and can operate with, e.g., independently-coded audio bitstreams. In addition, the invention can be applied to other types of digital information, including, for example, data, video and image information. Alternative embodiments of the invention can utilize other types of outer codes, other types of inner codes, other types of interleaving, e.g., block interleaving, convolutional interleaving or random interleaving, and a wide variety of different frame formats, including TDM, FDM or CDM frame formats, as well as combinations of these and other formats.

DETAILED DESCRIPTION OF THE INVENTION

Figure 1:
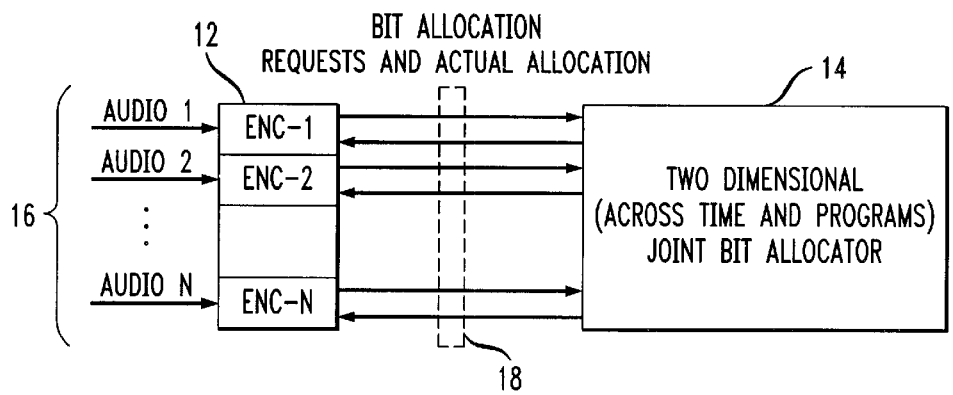
FIG. 1 shows an illustrative embodiment of a joint multiple program audio coder suitable for use in conjunction with the invention.

The invention will be described below in conjunction with exemplary joint multiple program coding and decoding techniques in applications involving the transmission of audio information bits, e.g., audio bits generated by an audio coder such as the perceptual audio coder (PAC) described in D. Sinha, J. D. Johnston, S. Dorward and S. R. Quackenbush, "The Perceptual Audio Coder," in Digital Audio, Section 42, pp. 42-1 to 42-18, CRC Press, 1998. It should be understood, however, that the techniques of the invention may be applied to many other types of information, e.g., video or image information, and other types of coding devices. In addition, the invention may be utilized in a wide variety of different types of communication applications, including communications over the Internet and other computer networks, and over cellular multimedia, satellite, wireless cable, wireless local loop, high-speed wireless access, point-to-point and other types of communication systems. The invention may be utilized with any desired type of communication channel or channels, such as, for example, frequency channels, time slots, code division multiple access (CDMA) slots, and virtual connections in asynchronous transfer mode (ATM) or other packet-based transmission systems. The term "program" as used herein is intended to include any type of information signal, such as, for example, a given channel or other grouping of audio, video, data or other information, as well as portions or combinations of such channels or groupings. The term "criticality measure" as used herein refers generally to any bit requirement indicator associated with a given signal, or portion thereof, to be coded. The value of a criticality measure at a given point in time thus indicates the bit requirements associated with coding the corresponding signal or signal portion. A criticality flag is an example of one particular type of criticality measure.

In an audio program, transients or onsets typically represent the most critical information in terms of coding severity and bit demand. For onsets, the bit demand may be substantially larger than normal, particularly for subband coding schemes, and these are also most susceptible to coding artifacts. Experience with PAC encoding at 64 kbps stereo indicates that distortions in the onsets represent the most audible artifact of the coding process. In PAC encoding, the presence of onsets in an audio frame is indicated using a criticality flag. In its simplest form, the criticality flag is a single-bit binary flag indicating the presence or absence of onsets. A continuous or multi-bit value may also be used, in which case intermediate values of criticality flag, e.g., between 0.0 and 1.0, represent the relative richness of a non-onset audio segment. For example, the intermediate values of the criticality flag may be higher if there are transients or other higher harmonic contents in the segment. An illustration of a three-valued criticality flag may utilize a value of 0 to indicate stationary low-complexity audio, a value of 0.5 to indicate stationary higher-complexity audio, and a value of 1 to indicate an onset or transient segment. Of course, the invention may utilize many other types of criticality measures.

FIG. 1 shows a joint multiple program audio coder 10 which may be utilized in conjunction with the invention. The coder 10 includes a PAC encoder bank 12 which is comprised of N PAC audio coders ENC-1, ENC-2, ... ENC-N, and a two-dimensional joint bit allocator 14. A set of input audio signals 16, including audio programs designated Audio 1, Audio 2, ... Audio N, are supplied to PAC encoders ENC-1, ENC-2, ... ENC-N, respectively, in the PAC encoder bank 12. The set of N audio programs are also referred to herein as a "cluster" of programs. The cluster of N audio programs may be a subset of a total number $N_T$ of programs to be transmitted in a given system, i.e., $1 \leq N \leq N_T$. The remaining $N_T$-N programs, if any, may include, e.g., data programs that are not included in the joint audio coding operation. The joint bit allocator 14 allocates a common pool of available bits for a given time interval among the N audio programs, using techniques which will be described in greater detail below. This allows larger percentages of the available bits to be allocated to the more demanding audio programs, on a substantially instantaneous basis.

Bit allocation requests are sent by the encoders ENC-1, ENC-2, ... ENC-N to the joint bit allocator 14, and the joint bit allocator 14 responds with actual bit allocations. Element 18 represents the bit allocation requests and actual allocations. In a typical implementation, the value of N may be on the order of 20 to 25, although other values could of course be used. As noted previously, an N-program cluster may represent, e.g., all of the audio programs in a given set of NT programs to be transmitted in a communication system, or a designated subset of the given set of NT programs. In the latter case, the particular programs in the subset may vary, e.g., as a function of time.

The basic operation of the joint bit allocator 14 is as follows:

1. At fixed time intervals, e.g., every $T_f$ msecs where $T_f$ is the frame duration, typically 22 msec in PAC encoding, a bit allocation request is made by each participating program encoder ENC-1, ENC-2, ... ENC-N in PAC encoder bank 12 to the joint bit allocator 14. The bit allocation request from a given one of the N programs, i.e., the ith program where i=1, 2, ... N, may be comprised of two components: (i) actual bit demand for perceptual coding of the audio information of the ith program in the $T_f$ time interval; and (ii) a criticality measure $C_f$ (i), e.g., single-bit or multi-bit criticality flag, indicating the criticality of the audio information of the ith program in the $T_f$ time interval. As noted above, in the case of audio programs, criticality may reflect the presence of certain critical features in the audio, such as onsets, transients or harmonics, or of a general characteristic or other quality, such as contribution to "richness" of the audio. As another example, the criticality measure $C_f(i)$ may be a linear criticality flag providing a number characterizing a designated quality of the corresponding program. Such a linear criticality flag will generally utilize multiple bits to provide a range of measures of criticality for a portion of an audio program.

2. The joint bit allocator 14 considers several factors in jointly processing the bit allocation requests from the individual program encoders. These factors include current and past bit allocation requests from the program encoders, average rate for a particular program, and allowable system delay, e.g., due to source coding and decoding. The outcome of the allocator processing is a bit rate assignment for each of the N programs for the current time interval. These assignments are then fed back to the individual program encoders ENC-1, ENC-2, ... ENC-N.

3. Each program encoder operates its rate loop mechanism to maintain the bit rate requirement at or below the actual bit assignment. Because of imprecise control over the bit demand (due to Huffman coding), a given program encoder may still have some unused bit capacity (almost always less than 50 bits, typically 10–25 bits). This excess capacity may be used for auxiliary data, e.g., program associated data, and may be on the order of 500–1500 bps. Theoretically, it is also possible to return unused capacity to the joint bit allocator for future use. However, this will generally result in added complexity without significant additional joint coding gains.

Figure 2:
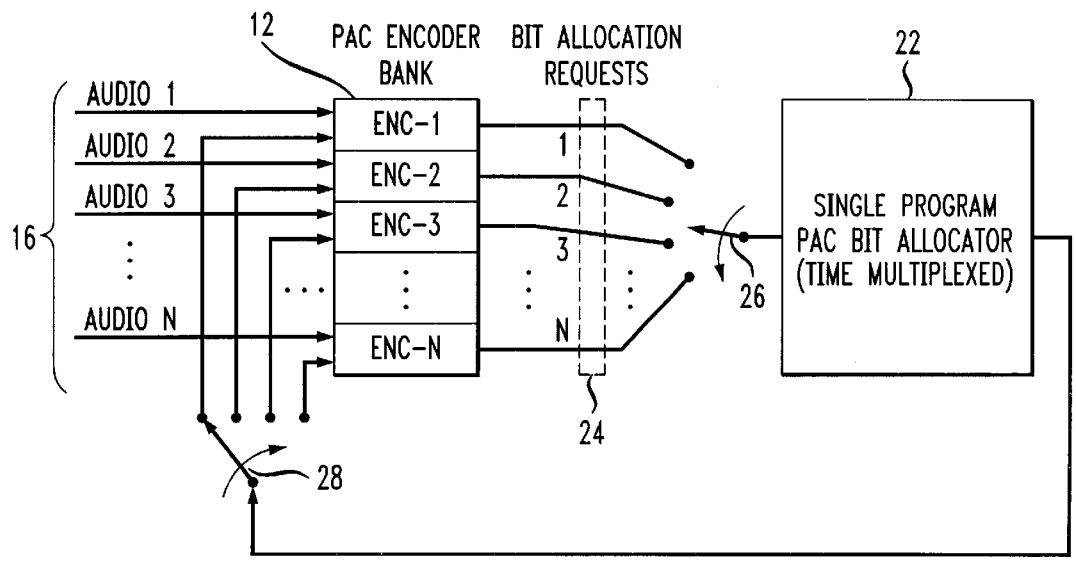
FIG. 2 shows an alternative embodiment of a joint multiple program audio coder suitable for use in conjunction with the invention.

It should be noted that, as an alternative to the two-dimensional joint coding illustrated in FIG. 1, the above-noted conventional single program PAC bit allocation may be extended to N audio programs. FIG. 2 shows an alternative joint multiple program coder 20 suitable for use in conjunction with the invention. The coder 20 includes the PAC encoder bank 12 driven by the set of N audio program inputs 16 as previously described, and a conventional single program PAC bit allocator 22. The bit allocator 22 is one-dimensional, i.e., operates over the time dimension only. A set of N bit allocation requests 24 from the PAC encoders ENC-1, ENC-2, ... ENC-N are sampled by switch 26 and delivered serially to the single program allocator 22. Bit allocations from the single program bit allocator 22 are delivered serially via switch 28 to the appropriate encoders. The joint coder 20 essentially time multiplexes the single program bit allocator 22 among the N audio programs. This alternative joint multiple program coder requires a considerably longer system delay, i.e., N times the system delay associated with a single program encoder, in order to provide performance similar to the two-dimensional joint multiple program coder 10 of FIG. 1. It may therefore be unsuitable for use in applications which are sensitive to long delays.

Figure 3:
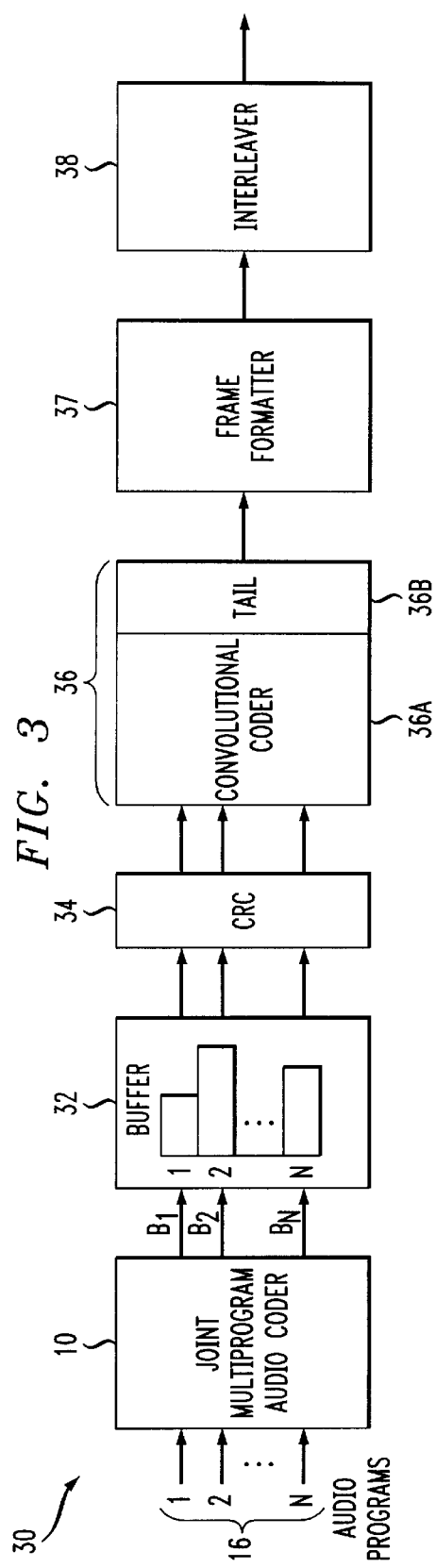
FIG. 3 shows a portion of a transmitter providing joint multiple program audio coding suitable for use in conjunction with the invention.

FIG. 3 shows a transmitter 30 incorporating the joint multiple program audio coder 10 of FIG. 1. The output of the multiple program coder 10 is a set of N output bitstreams $B_1$, $B_2$, ... $B_N$. A given output bitstream $B_i$ represents an encoded audio signal, e.g., a sequence of audio packets, generated from the ith audio program. The output bitstreams $B_i$ are delivered to a buffer 32, and cyclic redundancy codes (CRCs) are computed for each of the streams in a CRC device 34. The CRC is an example of one type of "outer code" that may be used in transmitter 40. Other possible outer codes include, e.g., Reed-Solomon (RS) codes, Bose-Chadhuri-Hocquenghem (BCH) codes, and other linear block codes. In the transmitter 30, the buffer 32 is filled up with CRC frames up to the capacity of a designated fixed length frame, referred to herein as an "F frame," plus a constant overhead. Each program bitstream is then individually convolutionally coded and terminated with a tail inside the F frame, using a convolutional coder bank 36 which includes a set of individual convolutional encoders 36A and a tail generator 36B. As will be described in greater detail below, this separate channel coding allows each program to be decoded with a single, relatively low speed Viterbi decoder, with a known upper bound on its operating bit rate, such that instantaneous tuning is possible for all programs. Although alternative embodiments could utilize joint channel coding over all or a subset of the N programs, this would generally require higher speed Viterbi decoders and more complex deinterleaving. The convolutional coding in coder bank 36 is an example of a type of "inner code" that is used in the transmitter 30. Other types of inner codes may also be used, including block or convolutional codes, so-called "turbo" codes, and coding associated with trellis coded modulation.

Figure 4:
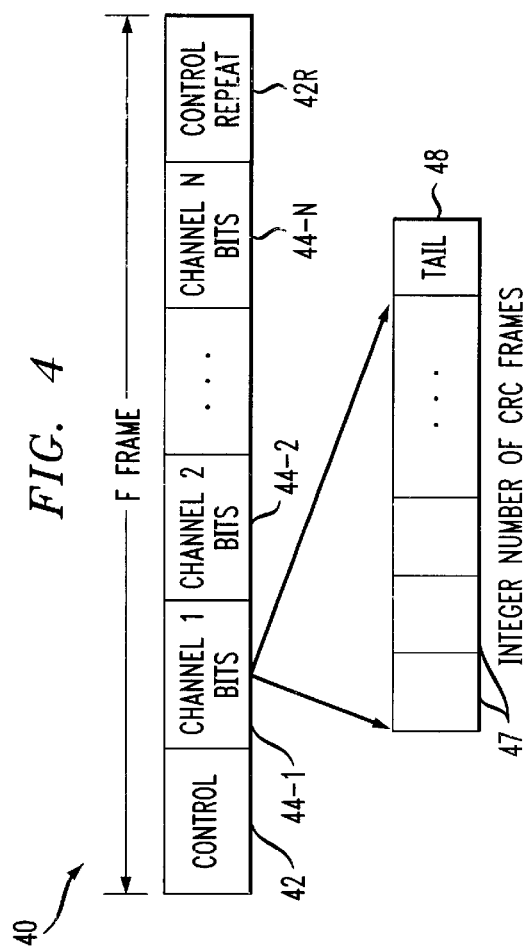
FIG. 4 shows an exemplary frame format for use in the transmitter of FIG. 3.

The transmitter 30 further includes a frame formatter 37 which forms the above-noted F frames from the outputs of the convolutional coder bank 36. Interleaving is done in interleaver 38 over a set of one or more of the fixed-length F frames. FIG. 4 shows an example of an F frame 40 which may be generated by the frame formatter 37 in a time division multiplexed (TDM) format. The F frame 40 includes control information 42, encoded audio data bits 44-1, 44-2, . . . 44-N for the N audio channels, and repeated control information 42R. In this example, each of the sets of encoded audio bits 44-i, i=1, 2, . . . N, includes an integer number of CRC frames 47 and a terminating tail 48. As part of the frame formatting process, the multiple program control information may be repeated, e.g., as repeated control information 42R, and error protected with its own terminated convolutional inner code and its own CRC outer code, such that the control information is provided with a higher level of error protection than the non-control information. The control information may alternatively use the same outer and/or inner codes as the non-control information.

The control information in F frame 40 may include, e.g., an indication of the number of CRC frames for each program, frame synchronization information such as a frame sync word, interleaver synchronization information, subscriber identification/control information, e.g., for a pay radio service, program content information such as rate, type (audio/data/voice), etc., and transmission parameters such as type of audio coding, type of outer and inner channel coding, use of joint multiple program audio coding on all or a subset of a given set of programs, multidescriptive coding, and unequal error protection (UEP). Portions of this control information may change very slowly with system configuration updates and program channel reshuffling, such that the complete set of information does not have to be included in one frame header, but can instead be spread out over a number of F frames.

The transmitter 30 of FIG. 3 will generally include additional processing elements, such as modulators, multiplexers, upconverters and the like, which are not shown in FIG. 3 for simplicity of illustration. In addition, the transmitter may be implemented using elements other than those shown. Moreover, elements of the transmitter 30, such as the joint multiple program audio coder 10, may be implemented at least in part using an application-specific integrated circuit, microprocessor or any other type of digital data processor, as well as portions or combinations of these and other known devices. Elements of the transmitter 30 may also be implemented in the form of one or more software programs executed by a central processing unit (CPU) or the like in computer or other digital data processor.

Figure 5:
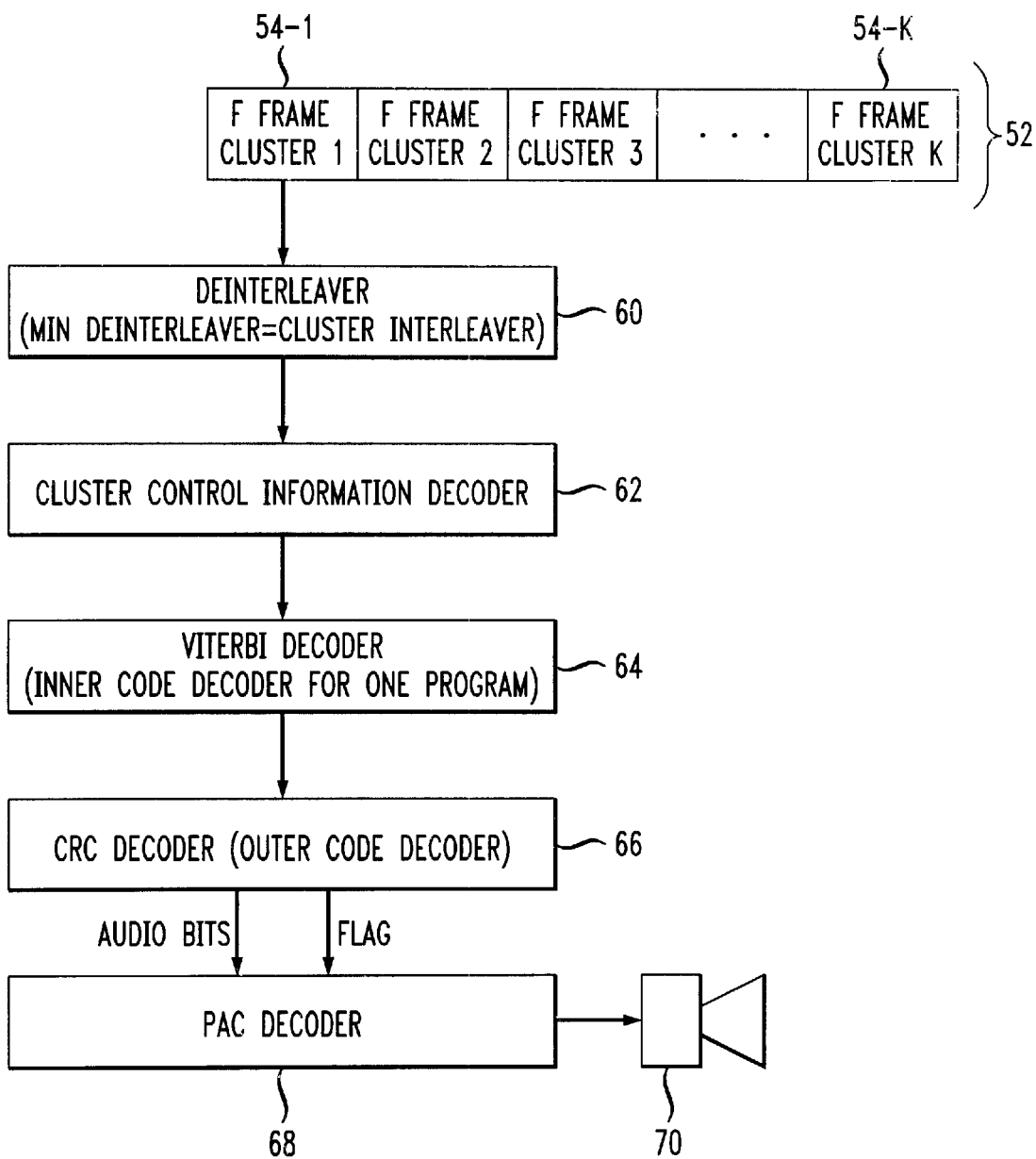
FIGS. 5, 6 and 7 show illustrative embodiments of multiple program decoders in accordance with the invention.
Figure 6:
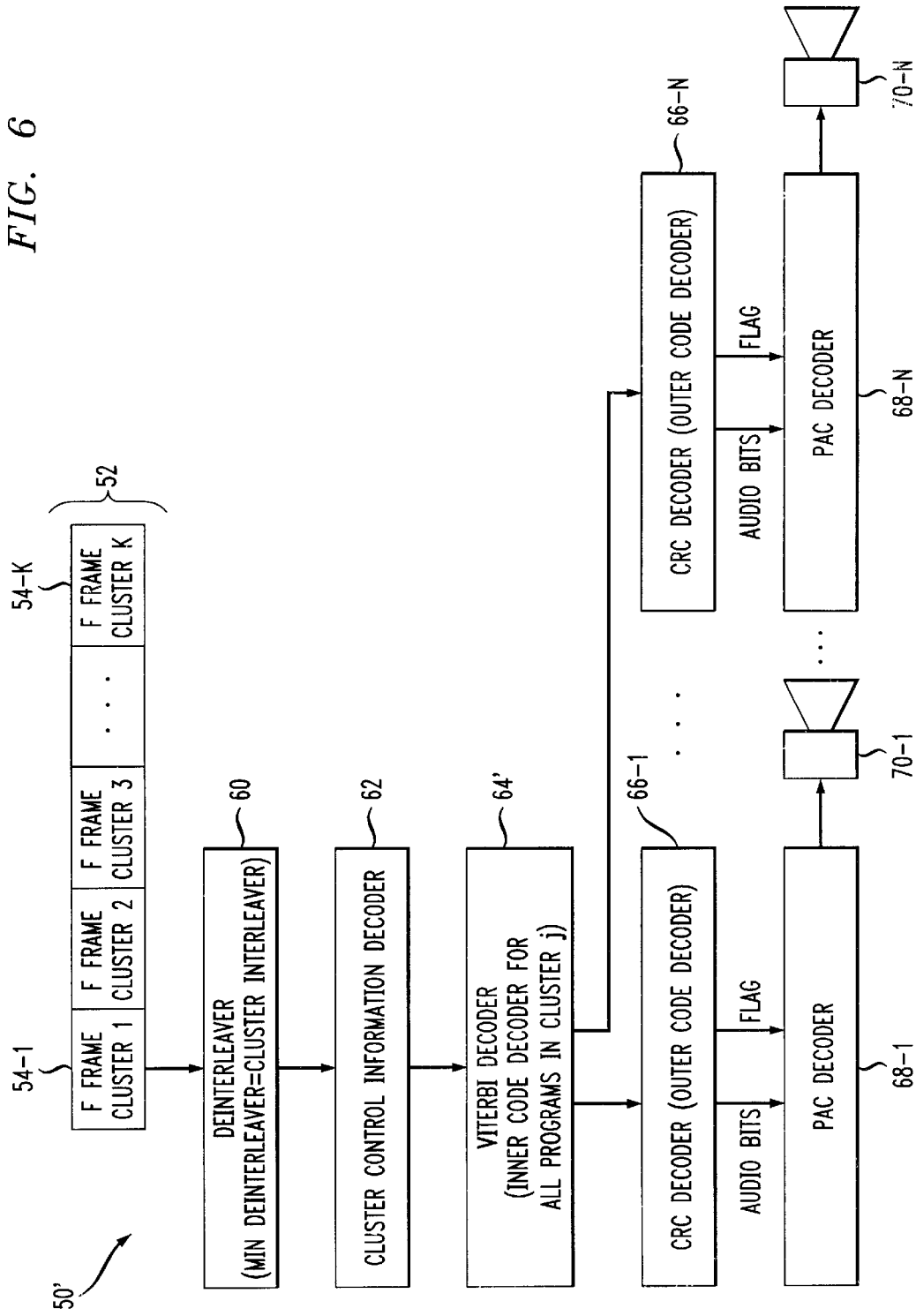
Figure 7:
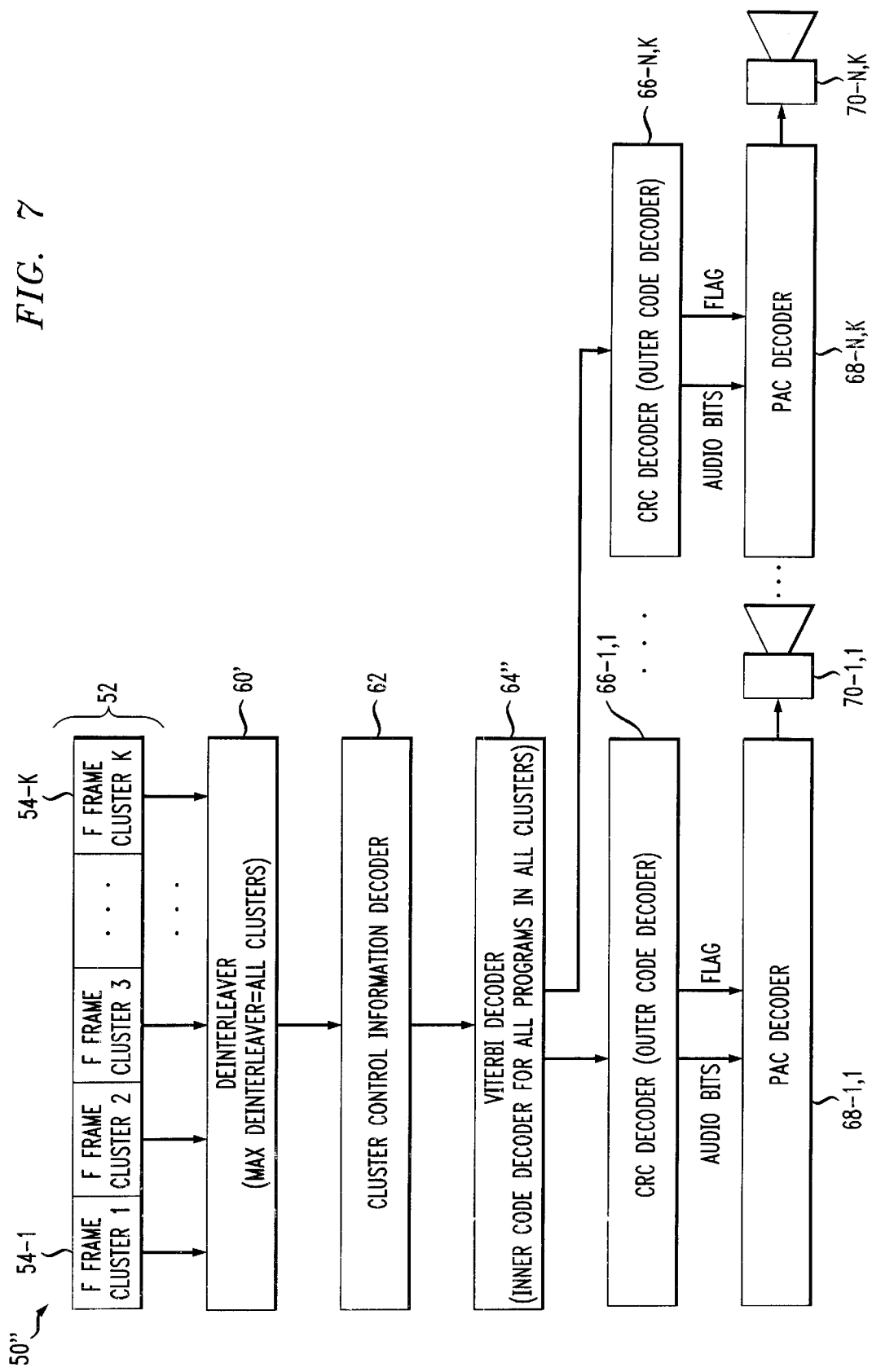

FIGS. 5, 6 and 7 show illustrative embodiments of multiple program decoders in accordance with the invention. Although these decoders are particularly well suited for use in decoding clusters of audio programs generated in the manner described in conjunction with FIGS. 1–4 above, it will be apparent to those skilled in the art that the illustrative decoders may be configured to operate with many other types of multiple program transmission systems. For example, the illustrative decoders do not require that the multiple programs be jointly coded. As will be described below, the decoders of FIGS. 5, 6 and 7 can provide substantially instantaneous tuning between programs within a given cluster (FIGS. 5 and 6) or within a set of clusters (FIG. 7). The cost tradeoffs associated with providing the various types of substantially instantaneous tuning to be described include the amount of memory required for the deinterleaving, the complexity and operating bit rate of the inner code decoder, e.g., the Viterbi decoder, and the required number of outer code decoders, e.g., CRC decoders, and PAC decoders.

FIG. 5 shows a multiple program decoder 50 in accordance with a first illustrative embodiment of the invention. The decoder 50 is suitable for decoding a single program within a given cluster of programs. The input to the decoder 50 is a set of F frames 52 including F frames 54-1, 54-2, . . . 54-K from respective clusters denoted Cluster 1, Cluster 2, . . . Cluster K. It should be noted that each of the K clusters need not include the same number of programs, although for simplicity it will be assumed in the illustrative embodiment that each cluster includes N programs. At a given point in time, an F frame from one of the clusters is applied to a deinterleaver 60. The deinterleaver 60 is a minimum-memory deinterleaver which has a deinterleaving length suitable for deinterleaving over a single cluster. Deinterleaver 60 is thus able to provide substantially instantaneous tuning between programs within a given cluster. The deinterleaved output for a selected one of the clusters, i.e., Cluster 1 in the example of FIG. 5, is applied to a cluster control information decoder 62, which recovers the above-described control information or a suitable portion thereof.

A Viterbi decoder 64 or other suitable inner code decoder is then used to decode the inner code of a selected one of the programs within the selected cluster. The Viterbi decoder 64 is a minimum-complexity, i.e., low-speed, decoder which decodes over only a single program. The Viterbi decoder 64, and other such inner code decoders referred to herein, may make use of the List Viterbi algorithm (LVA) as described in, e.g., N. Seshadri and C-E. W. Sundberg, "List Viterbi decoding algorithms with applications," IEEE Transactions on Communications, Vol. 42, pp. 311–323, February/March/April 1994, and C. Nill and C-E. W. Sundberg, "List and soft symbol output Viterbi algorithms: Extensions and comparisons," IEEE Transactions on Communications, Vol. 43, February/March/April 1995, both of which are incorporated by reference herein.

The output of the Viterbi decoder 64 is supplied to a CRC decoder 66 which decodes the outer code, and generates a flag indicative of the presence or absence of errors in the decoded outer code. The resulting audio bits and flag are supplied to a PAC decoder 68 which reconstructs the original analog signal and supplies it to an output device 70, e.g., a speaker or a set of speakers. The invention is suitable for use with a variety of different types of speakers, including, for example, mono, stereo and surround sound speakers, as well as combinations of these and other types of speakers or output devices. The tuning delay in the FIG. 5 embodiment, i.e., the delay in tuning from one program in a given cluster to another in the same cluster, includes delays associated with inner code decoding in Viterbi decoder 64, outer code decoding in decoder 66, and PAC decoding in PAC decoder 68.

FIG. 6 shows a multiple program decoder 50' in accordance with a second illustrative embodiment of the invention. The decoder 50' is suitable for decoding multiple programs, e.g., each of a set of N programs, within a given cluster of programs. The input to the decoder 50' is the set of F frames 52 including F frames 54-1, 54-2, . . . 54-K from respective clusters Cluster 1, Cluster 2, . . . Cluster K. The decoder 50' includes minimum-memory deinterleaver 60 and cluster control information decoder 62, both of which operate substantially as described in conjunction with decoder 50 of FIG. 5. Unlike decoder 50 of FIG. 5, however, the decoder 50' includes a Viterbi decoder 64' which decodes the inner code for all programs in a given cluster, i.e., Cluster j, where j=1, 2, . . . K. The decoder 50' can therefore simultaneously decode up to N programs, i.e., all of the programs within a given cluster. The decoded inner code for each of the N programs may be supplied to a separate CRC decoder 66-i, i=1, 2, . . . N, with the resulting audio bits and flag supplied to a corresponding PAC decoder 68-i. The reconstructed audio output of a given one of the PAC decoders 68-i is supplied to a corresponding output device 70-i. There is substantially no tuning delay associated with Viterbi decoding in the embodiment of FIG. 6, and tuning delays associated with outer code decoding and PAC decoding can be substantially eliminated by using N separate CRC decoders 66-i and N separate PAC decoders 68-i.

It should be noted that, although the decoder 50' can simultaneously decode up to N programs, it need not include a separate CRC decoder 66-i, PAC decoder 68-i and output device 70-i for each program. For example, the decoder 50' in a given implementation could include a separate set of CRC decoder, PAC decoder and output device for each desired separately-tunable audio output, e.g., one set for the front seat and one for the back seat in an automobile, or one for each seat in a given group of seats in an airplane, train, bus or other type of mass transit vehicle. The decoder 50' may also include one or more sets of decoders and output devices for decoding and processing other types of programs, e.g., non-audio data programs decoded and delivered to a computer or other digital data processing device.

FIG. 7 shows a multiple program decoder 50" in accordance with a third illustrative embodiment of the invention. The decoder 50" is suitable for decoding multiple programs, e.g., each of a set of N programs, for each of K clusters of programs. The input to the decoder 50" is the set of F frames 52 including F frames 54-1, 54-2, . . . 54-K from respective clusters Cluster 1, Cluster 2, . . . Cluster K. The decoder 50" includes a maximum-memory deinterleaver 60' which has a deinterleaving length suitable for deinterleaving over all of the K clusters. Deinterleaver 60' is thus able to provide substantially instantaneous tuning between all of the programs in the K clusters. The deinterleaved outputs of the deinterleaver 60' are applied to cluster control information decoder 62, and then applied to a Viterbi decoder 64" which decodes the inner code for all programs in the K clusters.

The decoder 50" of FIG. 7 can therefore simultaneously decode up to N×K programs, i.e., all of the programs within a given set of K clusters. The decoded inner code for each of the programs may be supplied to a separate CRC decoder 66-i, j, i=1, 2, . . . N, j=1, 2, . . . K, with the resulting audio bits and flag supplied to a corresponding PAC decoder 68-i, j. The reconstructed audio output of a given one of the PAC decoders 68-i, j is supplied to a corresponding output device 70-i, j. Again, as previously noted in conjunction with decoder 50', the decoder 50" need not include a separate a separate CRC decoder, PAC decoder and output device for each program, and may include one or more sets of decoders and output devices for decoding and processing other types of programs, e.g., non-audio data programs.

It should be noted that the deinterleavers in the above-described illustrative embodiments may be dealing with quantized soft symbol information, e.g., of the order of 4 bits per transmitted channel bit on a fading channel, and there is generally a small loss due to this quantization. In addition, almost all of the delay in transmission is caused by interleaving/deinterleaving delays, although there is also some minor delay in channel encoding/decoding and in PAC encoding/decoding. The terms "instantaneous tuning" or "substantially instantaneous tuning" as used herein refer generally to tuning that is done on program bitstreams that have been deinterleaved in parallel. As is apparent from the embodiments of FIGS. 6 and 7 above, this type of tuning can also be done on program bitstreams that have both been deinterleaved and channel decoded in parallel. As previously described, inner code decoding delay, although usually small compared to the interleaving delay, can be substantially eliminated using parallel program channel Viterbi decoding. Outer code decoding and PAC decoding delays can be substantially eliminated in a similar manner. For example, using Viterbi decoder 64' to decode over all programs in a cluster, in conjunction with N separate outer code decoders 66-i and PAC decoders 68-i, as shown in FIG. 6, substantially eliminates any tuning delays associated with inner code, outer code and PAC decoding.

Alternative embodiments of the invention can utilize other types of outer codes, e.g., RS, BCH or other linear block codes, and other types of inner codes, e.g., various types of convolutional codes, turbo codes, or coding associated with trellis coded modulation. The alternative embodiments could also utilize only an inner code and no outer code, or vice-versa. Embodiments which utilize an RS, BCH or other similar type of error correcting outer code can of course use the code for error correction as well as for generation of an error flag. Although the illustrative embodiments described above utilized block interleaving, the invention can also be implemented using, e.g., convolutional interleaving, random interleaving or other types of block interleaving.

It should also be noted that the TDM frame format shown in FIG. 4 is exemplary only, and should not be construed as limiting the invention to use with any specific type of TDM frame format, or TDM frame formats in general. The invention can be applied to decoding of a wide variety of other frame formats, including frequency division multiplexed (FDM) and code division multiplexed (CDM) formats, as well as combinations of TDM, FDM, CDM and other types of frame formats. Furthermore, although not described in detail herein, numerous different types of modulation techniques may be used in conjunction with the invention, including, e.g., single-carrier modulation in every channel, or multi-carrier modulation, e.g., orthogonal frequency division multiplexing (OFDM), in every channel. A given carrier can be modulated using any desired type of modulation technique, including, e.g., a technique such as m-QAM, m-PSK or trellis coded modulation.

As previously noted, the invention can be applied to the transmission of digital information other than audio, such as data, video, images and other types of information. Although the illustrative embodiments use audio packets, such as those generated by a PAC encoder, the invention is more generally applicable to digital information in any form and generated by any type of compression technique. The invention may be implemented in numerous applications, such as simultaneous multiple program listening and/or recording, simultaneous delivery of audio and data, etc. These and numerous other alternative embodiments and implementations within the scope of the following claims will be apparent to those skilled in the art.

What is claimed is:

1. A method of decoding a plurality of programs transmitted in a communication system in a frame format in which a given frame includes information from each of the plurality of programs, and wherein the information in the frame is encoded using at least one code and then subsequently interleaved, the method comprising the steps of:

deinterleaving information corresponding to one or more frames using a specified deinterleaving length, wherein the specified deinterleaving length is a function of the particular number of the plurality of programs, so as to permit substantially instantaneous tuning between the plurality of programs;

decoding the at least one code for one or more of the programs; and generating an output signal corresponding to a selected one of the programs.

2. The method of claim 1 wherein at least a subset of the plurality of programs are jointly coded audio programs.

3. The method of claim 1 wherein the information in the frame is encoded using an inner code and an outer code, and the decoding step includes decoding the inner code over one or more of the programs, and decoding the outer code for a selected one of the programs.

4. The method of claim 3 wherein the inner code is one of a convolutional code, a turbo code and a trellis code.

5. The method of claim 3 wherein the outer code is a linear block code comprising one of a CRC code, an RS code and a BCH code.

6. The method of claim 3 wherein the deinterleaving length corresponds to a cluster of N of the programs, and the step of decoding the inner code includes decoding over a single one of the N programs.

7. The method of claim 3 wherein the deinterleaving length corresponds to a cluster of N of the programs, and the step of decoding the inner code includes decoding over all of the N programs in the cluster.

8. The method of claim 3 wherein the deinterleaving length corresponds to a set of K clusters, each including a plurality of programs, and the step of decoding the inner code includes decoding over all of the programs in each of the K clusters.

9. An apparatus for use in decoding a plurality of programs transmitted in a communication system, comprising:

a deinterleaver for deinterleaving information corresponding to one or more frames using a specified deinterleaving length, wherein a given frame includes information from each of the plurality of programs, wherein the specified deinterleaving length is a function of the particular number of the plurality of programs, so as to permit substantially instantaneous tuning between the plurality of programs, and wherein the information in the frame is encoded using at least one code and then subsequently interleaved;

a code decoder, having an input coupled to an output of the deinterleaver, for decoding the at least one code over one or more of the programs; and at least one program decoder, having an input coupled to an output of the code decoder, for generating an output signal corresponding to a selected one of the programs.

10. The apparatus of claim 9 wherein at least a subset of the plurality of programs are jointly coded audio programs.

11. The apparatus of claim 9 wherein the information in the frame is encoded using an outer code and an inner code, and the code decoder further includes:

an inner code decoder, having an input coupled to an output of the deinterleaver, for decoding the inner code over one or more of the programs; and at least one outer code decoder, having an input coupled to an output of the inner code decoder, for decoding the outer code for a selected one of the programs.

12. The apparatus of claim 11 wherein the inner code is one of a convolutional code, a turbo code and a trellis code.

13. The apparatus of claim 11 wherein the outer code is a linear block code comprising one of a CRC code, an RS code and a BCH code.

14. The apparatus of claim 11 wherein the deinterleaving length corresponds to a cluster of N of the programs, and the inner code decoder decodes the inner code over a single one of the N programs.

15. The apparatus of claim 11 wherein the deinterleaving length corresponds to a cluster of N of the programs, and the inner code decoder decodes the inner code over all of the N programs in the cluster.

16. The apparatus of claim 11 wherein the deinterleaving length corresponds to a set of K clusters, each including a plurality of programs, and the inner code decoder decodes the inner code over all of the programs in each of the K clusters.

17. The apparatus of claim 11 further including a plurality of outer code decoders, each decoding an outer code for one of the plurality of programs.

18. The apparatus of claim 17 further including a plurality of individual program decoders, each having an input coupled to an output of a corresponding one of the plurality of outer code decoders, and each generating an output signal for one of the plurality of programs.

19. A method of decoding a plurality of programs transmitted in a communication system, the method comprising the steps of:

decoding frames containing the programs, wherein a given frame includes information from each of the plurality of programs, the information in the frame is encoded using at least one code and then subsequently interleaved, and each of at least a subset of the frames are deinterleaved over multiple ones of the programs prior to decoding, utilizing a deinterleaving length that is a function of the particular number of the plurality of programs, so as to permit substantially instantaneous tuning between the plurality of programs; and generating an output signal corresponding to a selected one of the programs.

20. An apparatus for decoding a plurality of programs transmitted in a communication system, the apparatus comprising:

a multiple program decoder operative: (i) to decode frames containing the programs, wherein a given frame includes information from each of the programs, the information in the frame is encoded using at least one code and then subsequently interleaved, and each of at least a subset of the frames are deinterleaved over multiple ones of the programs prior to decoding, utilizing a deinterleaving length that is a function of the particular number of the plurality of programs, so as to permit substantially instantaneous tuning between the plurality of programs, and (ii) to generate an output signal corresponding to a selected one of the programs.

* * * * *